US012694488B2

(12) United States Patent (10) Patent No.: US 12,694,488 B2
Vestad (45) Date of Patent: Jul. 28, 2026

(54) METHOD FOR INVERTING MOTION BLUR OF AN IMAGE CAPTURED IN A MULTIPLE CAMERA SYSTEM

(71) Applicant: Muybridge AS, Oslo (NO)

(72) Inventor: Vegard Nitter Vestad, Oslo (NO)

(73) Assignee: Muybridge AS, Oslo (NO)

( * ) Notice: Subject to any disclaimer, the term of this patent is extended or adjusted under 35 U.S.C. 154(b) by 42 days.

(21) Appl. No.: 19/047,820

(22) Filed: Feb. 7, 2025

(65) Prior Publication Data

US 2026/0024181 A1 Jan. 22, 2026

(30) Foreign Application Priority Data

Jul. 18, 2024 (NO) .................................... 20240767

(51) Int. Cl.
*G06T 5/73* (2024.01)
*G06T 5/50* (2006.01)
(Continued)

(52) U.S. Cl.
CPC .................. *G06T 5/73* (2024.01); *G06T 5/50* (2013.01); *G06T 7/13* (2017.01); *G06T 7/194* (2017.01); *G06T 2207/20201* (2013.01)

(58) Field of Classification Search
CPC .... G06T 5/73; G06T 5/50; G06T 7/13; G06T 7/194; G06T 2207/20201;
(Continued)

(56) References Cited

U.S. PATENT DOCUMENTS 6,778,207 B1 * 8/2004 Lee ........................ H04N 23/90
348/47
7,711,201 B2 * 5/2010 Wong ..................... G03B 13/30
382/254
(Continued)

FOREIGN PATENT DOCUMENTS

CN 101621634 A 1/2010
CN 104820971 B 11/2017
JP 2006050070 A 2/2006

OTHER PUBLICATIONS

European Patent Office, Extended European Search Report for corresponding Application No. 25156621.2, dated May 26, 2025, 9 pages.
(Continued)

*Primary Examiner* — Hung H Lam
(74) *Attorney, Agent, or Firm* — Leech Tishman Fuscaldo & Lampl, LLC

(57) ABSTRACT
The present invention provides a system and method for utilizing multiple camera systems including at least three cameras, each camera having at least partly overlapping fields for removing blur in a moving object relative to a static background captured by the multiple camera system, comprising separating and extracting the moving object from the static background by isolating pixels corresponding to the moving object and distinguishing them from the static background by using images captured by the at least three cameras having field of views covering the moving object, enhancing clarity of the separated moving object by deblurring the separated moving, blurring the static background, reintegrating the deblurred separated moving object onto the blurred static background in the position of the images where the separated moving object was extracted.

7 Claims, 6 Drawing Sheets

(51) Int. Cl.
    *G06T 7/13*         (2017.01)
    *G06T 7/194*      (2017.01)

(58) Field of Classification Search
    CPC . G06T 2207/30221; G06T 5/70; G06T 7/215;
                G06T 7/292; G06T 2207/10016; H04N
                    23/00; H04N 13/10; H04N 13/106
    See application file for complete search history.

(56)                 References Cited

U.S. PATENT DOCUMENTS

| 9,094,606 | B2 * | 7/2015 | Streeter ................... G01S 17/89 |
|---|---|---|---|
| 10,565,691 | B2 | 2/2020 | Ahn et al. |
| 10,791,285 | B2 | 9/2020 | Choi |
| 2005/0047672 | A1 * | 3/2005 | Ben-Ezra .................. G06T 5/73 |
| | | | 382/255 |
| 2011/0304687 | A1 * | 12/2011 | Joshi ................... H04N 23/698 |
| | | | 348/36 |
| 2017/0011494 | A1 * | 1/2017 | Ahn .......................... G06T 5/73 |
| 2019/0104252 | A1 * | 4/2019 | Starr ...................... H04N 23/45 |
| 2024/0311968 | A1 * | 9/2024 | Shekarforoush .......... G06T 5/50 |
| 2025/0384653 | A1 * | 12/2025 | Liu ........................ G06V 10/36 |

OTHER PUBLICATIONS

Norwegian Search Report for corresponding Application No. 20240767, dated Feb. 14, 2025, 2 pages.

* cited by examiner

METHOD FOR INVERTING MOTION BLUR OF AN IMAGE CAPTURED IN A MULTIPLE CAMERA SYSTEM

CROSS-REFERENCE TO RELATED APPLICATION

This application is related to and claims priority to Norwegian patent application No. 20240767, filed Jul. 18, 2024, the entirety of which is incorporated herein by reference.

FIELD

The present invention relates to a system and method for inverting motion blur of an image captured by multiple camera sensors. The system includes a set of camera sensors configured to capture video images from different viewpoints and perform "motion deblur" and "motion blur" on the video images.

BACKGROUND

In the fast-paced world of sports television production and broadcasting, capturing the thrill of live action is paramount. However, the dynamic nature of sporting events often presents a formidable challenge: motion blur. Whether it's a sprinting athlete, a speeding race car, or a soaring basketball, rapid movement can lead to blurred images that detract from the viewer's experience.

Consider the scenario of a cyclist whizzing past the camera, covering a distance of 10 centimeters in a mere 1 millisecond. In the resulting image, the cyclist appears as little more than a streak of motion, rather than a clear and dynamic subject. This phenomenon, known as motion blur, can diminish the clarity and excitement of live sports coverage, frustrating both viewers and broadcasters alike.

Traditionally, sports broadcasters have employed various techniques to mitigate the effects of motion blur and maintain the integrity of their broadcasts. One common approach involves deploying high-speed cameras with high shutter speeds, capable of capturing rapid motion with precision. However, this solution is not without its challenges. In multi-camera setups, each camera may have its limitations, requiring careful adjustment to balance shutter speed with light sensitivity and image quality.

Another strategy often employed is the synchronization of camera movement with that of the target object. By tracking the motion of athletes or vehicles and adjusting camera positioning accordingly, broadcasters can minimize motion blur and ensure that key moments are captured with clarity. Yet, this approach can be logistically complex and may not always be feasible in fast-paced sporting environments where split-second decisions are required.

Thus, despite advancements in camera technology and broadcasting techniques, the issue of motion blur remains a persistent concern for sports television production. A solution that offers a more streamlined and adaptable approach to mitigating motion blur, without compromising image quality or imposing undue logistical burdens, would be a welcome innovation in the industry.

It is within this context that the present invention aims to address the challenges of motion blur in sports broadcasting, offering a novel and effective solution that enhances the viewing experience for sports fans around the world. By leveraging cutting-edge technology and innovative methodologies, this invention promises to revolutionize the way motion blur is managed in live sports coverage, ensuring that every moment of excitement is captured with unparalleled clarity and precision.

Therefore, there is a need for a system solving the camera related problems discussed above in various fields and applications.

SUMMARY

In view of the above, an object of the present disclosure is to overcome or at least mitigate at least some of the drawbacks related to cameras. In particular, the present application discloses a method for utilizing a multiple camera system including at least three cameras, each camera having at least partly overlapping fields for removing blur in a moving object relative to a static background captured by the multiple camera system, comprising the steps of separating and extracting the moving object from the static background by isolating pixels corresponding to the moving object and distinguishing them from the static background by using images captured from the at least three cameras having field of views covering the moving object, enhancing clarity of the separated moving object by deblurring the separated moving, blurring the static background and reintegrating the deblurred separated moving object onto the blurred static background in the position of the images where the separated moving object was extracted. The present application also discloses a multicamera system corresponding to the above mentioned method.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
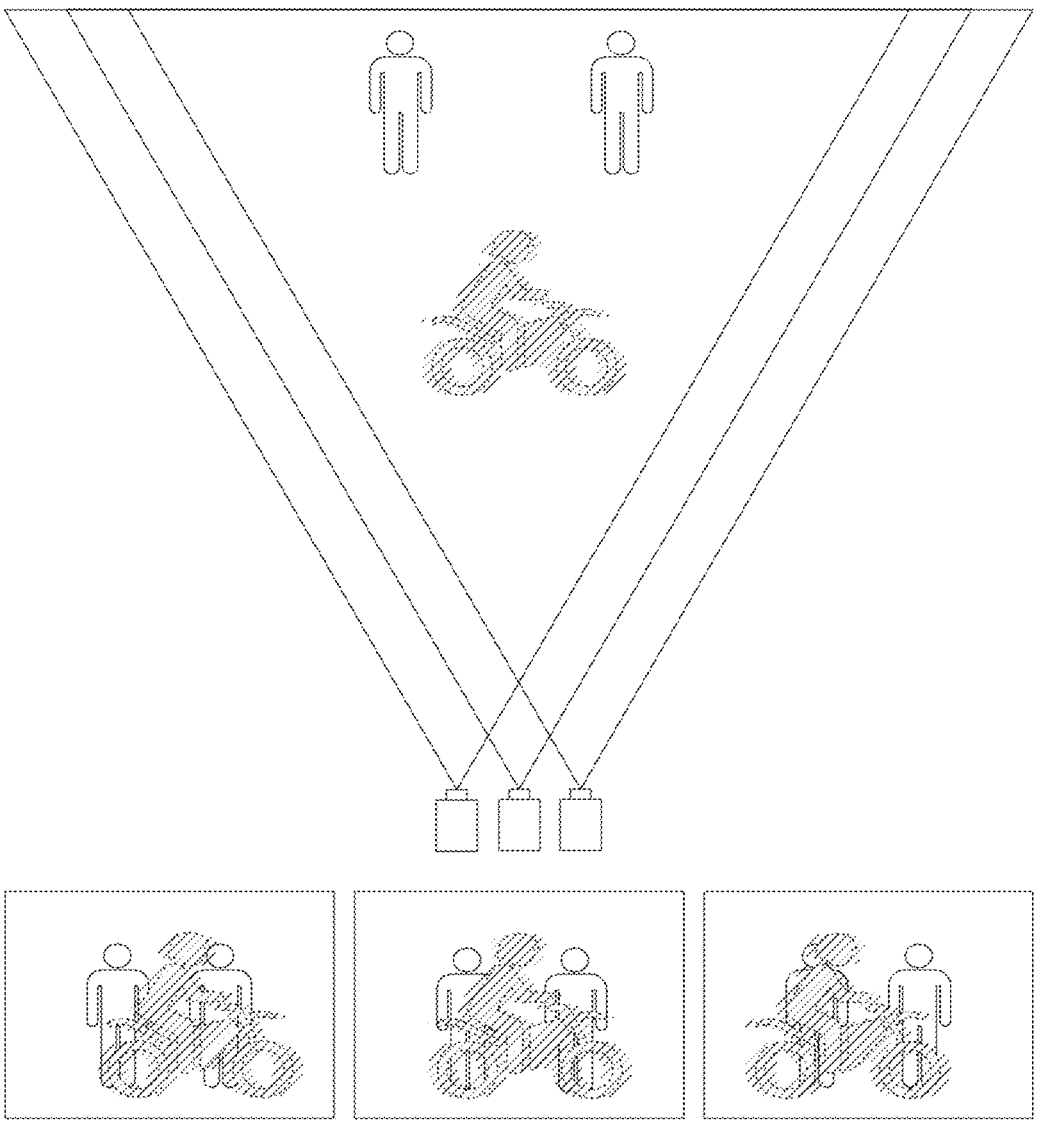
FIG. 1 illustrates an example of a multiple camera setup along a path where fast-moving objects relative to a background according to prior art.

The different aspects of the present invention are solving certain problems related to existing camera technology.

The different embodiments discussed herein, provide a robust method to achieve a crystal-clear depiction of fast-moving objects in digital video footage. They involve using multiple cameras to gather comprehensive visual data from behind the moving object. This data is used to separate the moving object from the background accurately. The separated object is then subjected to traditional deblurring techniques to enhance its clarity. To address the border areas where object pixels mix with background pixels, the background is blurred using traditional blurring techniques. The deblurred object is then reintegrated into the blurred background, with the border areas seamlessly blended. This dual process of deblurring the object and blurring the background enhances the overall robustness of the method, effectively filling in any artifacts from deblurring and concealing errors from the separation process.

According to the present application, a multiple camera setup is provided along a path where fast-moving objects relative to a background are to be captured.

Multiple cameras positioned at various angles may be employed to capture comprehensive visual data of the scene, including areas behind the fast-moving object. This multi-perspective approach allows for accurate separation of the moving object from the background. The setup could be a handful of cameras viewing a scene from different positions and angles. All cameras should be calibrated with intrinsic and extrinsic calibration. Further, all cameras should be synchronized, i.e. the images being captured within a time range significantly smaller than the camera framerate. All the cameras should view the same desired scene, but from a variety of angles and positions. More variety in camera viewpoints will increase the overall quality of the output produced.

A handful of images should be taken from all or a subset of the cameras. At least two images would be required, but more images will increase the overall quality of the output produced. The input images should show the same scene consisting of objects moving in different speeds and directions. Fast-moving objects will, to varying degrees, experience motion blur, and slow-moving objects will be mostly sharp.

According to various embodiments, the different captured fast-moving objects are separated from the background by using the data from multiple cameras. Advanced image processing algorithms identify and isolate the pixels corresponding to the moving object, distinguishing them from the static background. Due to the movement of the object relative to the background, and the characteristics of image capturing, there will be a mixed border area around the moving objects containing pixels both from the moving object and the background. At least some of this will inevitably be included in the separated fast-moving object.

Still according to the various embodiments of the present application, the separated moving object undergoes traditional deblurring techniques to enhance its clarity. Techniques such as blind deconvolution, non-blind deconvolution, and deep learning-based deblurring, the Richardson-Lucy method, Wiener filter method and Markov random field method. may be employed to achieve the desired clarity. According to some embodiments, the characteristics of the motion blur that should be inverted are required. The motion blur characteristics may be described using a Point Spread Function (PSF). PSF can be derived in multiple ways and will be specific to the application. A useful way is to derive it from the velocity amplitude and direction of the fast-moving object together with its distance to the camera. From the PSF it is possible to both apply and reverse motion blur using convolution and deconvolution methods.

To address the mixed pixels at the border areas, the background is blurred using traditional blurring techniques. Gaussian blur, motion blur, or other suitable methods may be applied to ensure a smooth and consistent background.

Further according to embodiment of the present application, the deblurred moving object is then reintegrated into the blurred background. Special attention is given to the border areas, where the blending process ensures a seamless transition between the object and the background. This blending hides any inconsistencies or errors from the separation process, resulting in a visually appealing and crystal-clear moving object against a blurred background.

Embodiments according to the present application will in the following be described referring to the accompanied figures.

FIG. 1 illustrates an example of a multiple camera setup along a path where fast-moving objects relative to a background that are to be captured, but without any embodiment according to the present application as discussed above. The objects with solid lines represent the background, and the shaded object represents the blurred fast-moving object. In this example, there are three cameras. Each camera covers the whole scene, including the fast moving object and the background. The three images in the bottom shows the views from the three cameras, respectively.

Figure 2:
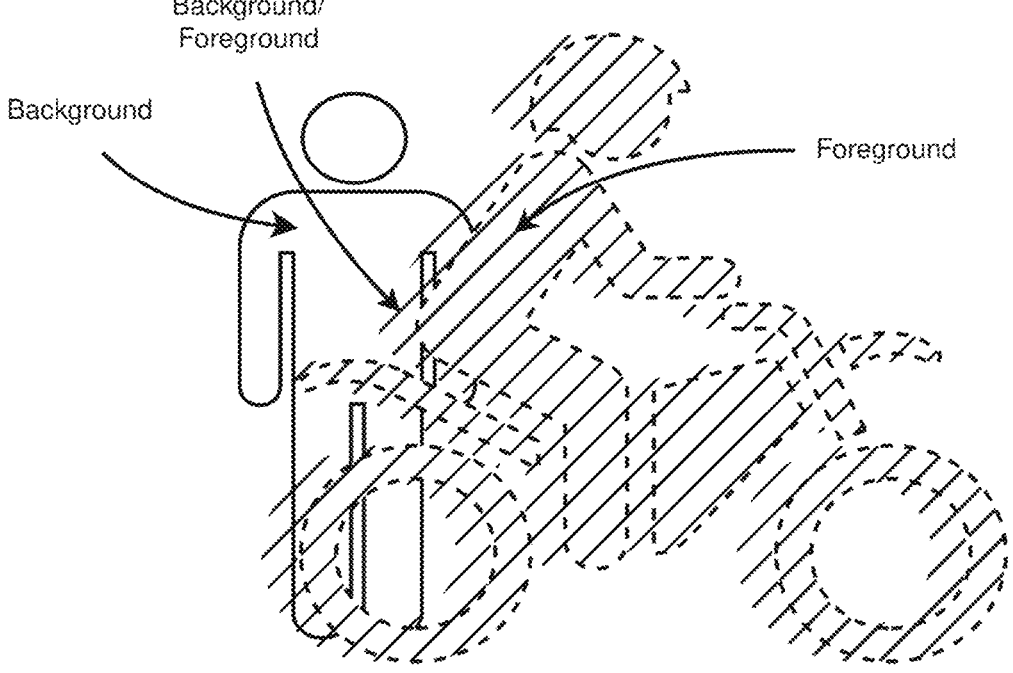
FIG. 2 provides a closer look at the foreground relative to the background according to prior art.

FIG. 2 provides a closer look at the foreground relative to the background. As can be seen, there is a mixed border area behind the fast-moving object a mixed border area containing pixels both from the moving object/foreground and the background.

Figure 3:
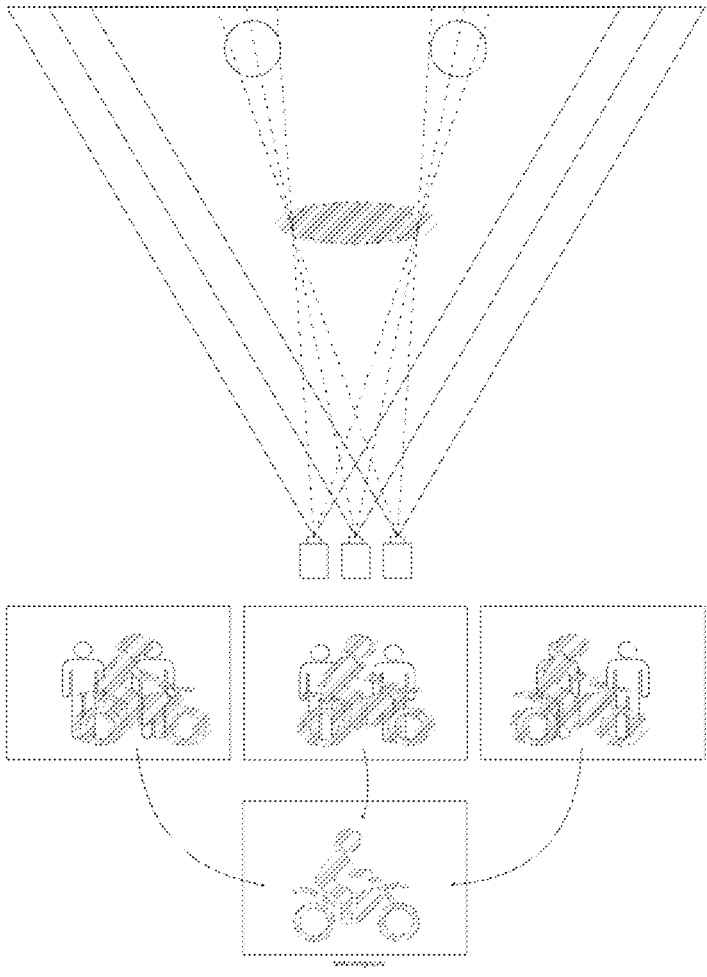
FIGS. 3-5 illustrate an example embodiment of the present application having the situation shown in FIGS. 1 and 2 as the basis.
Figure 4:
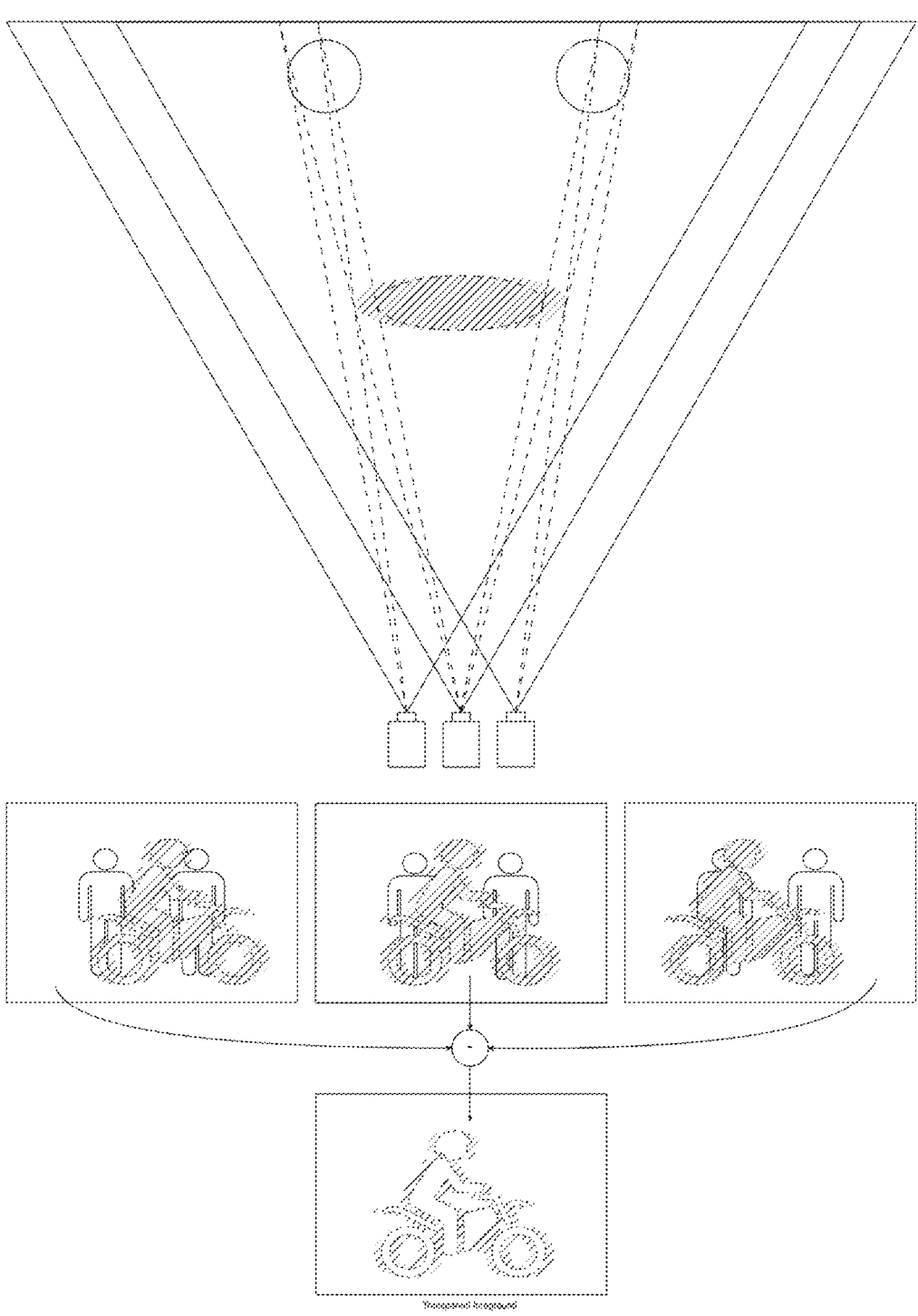
Figure 5:
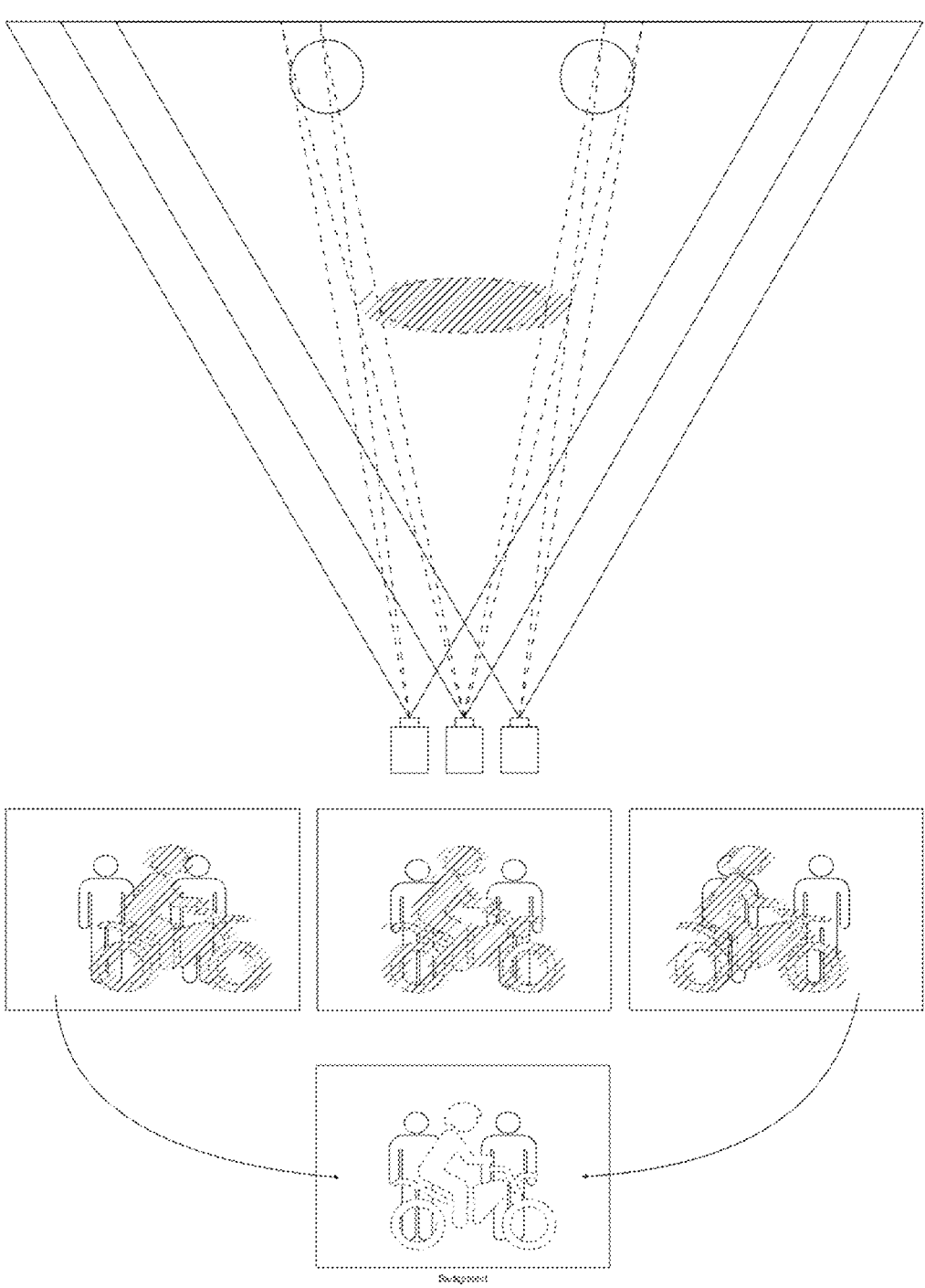

FIGS. 3-5 illustrate an example embodiment of the present application having the situation shown in FIGS. 1 and 2 as the basis. In the upper part of FIG. 3-5, the solid circles represent the background, the oval shaded area represents the fast-moving object and the border area, and the oval dashed circle represents the fast-moving object/foreground. The three images in the middle, show the views from the three cameras, respectively. The bottom view shows a result image.

In particular, FIG. 3 illustrates how the captured fast-moving objects may be separated from the background by using the data from multiple cameras. Advanced image processing algorithms identify and isolate the pixels corresponding to the fast-moving object, distinguishing it from the static background. The dotted lines extending from the cameras show how the fractions of each of their views together can separate the fast-moving object from the background. The result image at the bottom illustrates the separated fast-moving object without any of the mixed border area.

As already discussed, due to the movement of the object relative to the background, and the characteristics of image capturing, there will be a mixed border area around the moving objects containing pixels both from the moving object and the background. At least some of this will inevitably be included in the separated fast-moving object. The dotted lines extending from the cameras in the upper part of FIG. 4 illustrate how the fractions of each of their views together can identify the mixed border area around the moving objects. The result image at the bottom illustrates the transparent fast-moving object/foreground when the result image from FIG. 3 is removed, so that only the mixed border area remains.

FIG. 5 illustrates the same as FIG. 4, except for that the result image at the bottom illustrates the background with the hole resulting from the capturing of the fast-moving image/foreground. This is possible because the three cameras view the scene from different angles.

Figure 6:
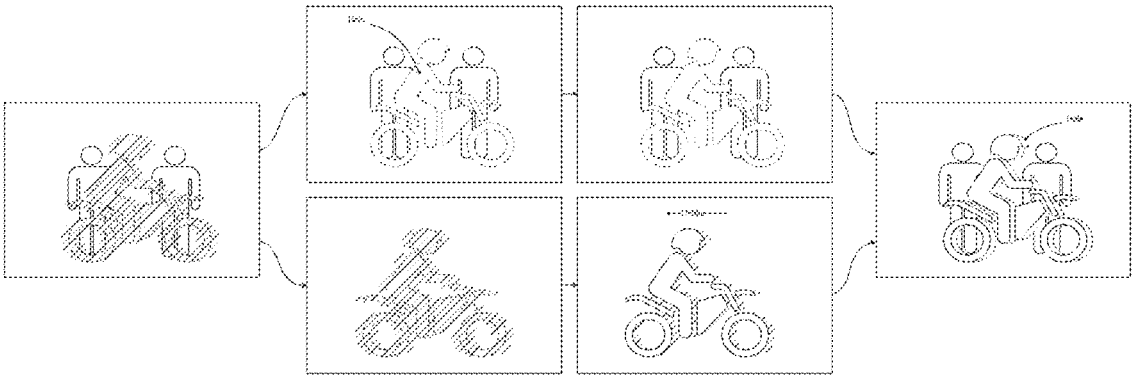
FIG. 6 illustrates the result of an original image after being processed according to an example embodiment of the present application, but without blurring the background.
Figure 7:
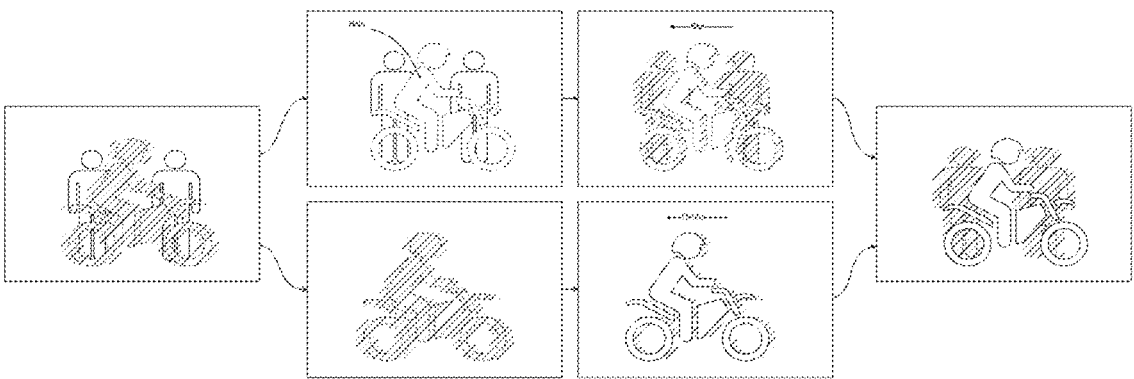
FIG. 7 illustrates the result of an original image after being processed according to an example embodiment of the present application.

The left-hand images of FIGS. 6 and 7 both illustrate the original image with the blurred fast-moving object including area of mixed pixels as a shaded silhouette with the clear background represented in solid lines. The upper two images illustrate the background when the fast-moving object/foreground is extracted, leaving a hole which is illustrated by the dotted line icon. The lower left-hand image illustrates the extracted blurred fast-moving object/foreground including the mixed border. The lower right-hand image illustrates the extracted fast-moving object/foreground including the mixed border after a deblurring process as discussed above. The icon with solid line represents the clear view of the fast-moving object/foreground. The shading represents remains of the border area, which is still visible after deblurring, as it contains a mix of pixels both from background and foreground.

The right-hand image of FIG. 6 is an illustration of how it may look like if the by just adding the unblurred extracted fast-moving object/foreground including the mixed border after the above discussed deblurring process to the background. The image is still uncomplete, leaving an undefinable area around the fast-moving object that would be unsatisfactory for a view of the scene.

In the right-hand upper image of FIG. 7, the background has been blurred. Further, the right-hand image of FIG. 7 then illustrates an example where the extracted unblurred fast-moving object/foreground including the mixed border is added to a background which is blurred according to the above discussion. Here, the pixels of the mixed border is blended with the blurred background, and is therefore hardly visible for a viewer. Hence, the fast-moving object has become crystal clear, the background has been subdued and there are no visible transitions in between.

The embodiments according to the present application discussed above significantly enhance the clarity of fast-moving objects in digital video footage.

The dual process of deblurring and blurring increases the robustness of the technique, effectively handling artifacts and separation errors.

Viewers experience a visually appealing scene with a crystal-clear moving object and a smooth, blurred background.

It must be emphasized that the terminology "comprise/comprises" as used in this specification is chosen to specify the presence of stated features, numbers, steps or components, but does not preclude the presence or addition of one or more other functions, numbers, steps, components or groups thereof. It should also be noted that the word "a" or "an" preceding an element does not exclude the presence of a plurality thereof.

What is claimed is:

1. A method for utilizing a multiple camera system including at least three cameras, each camera having at least partly overlapping fields for removing blur in a moving object relative to a static background captured by the multiple camera system, characterized in, separating and extracting the moving object from the static background by isolating pixels corresponding to the moving object and distinguishing the isolating pixels from the static background by using images captured by the at least three cameras having field of views covering the moving object, enhancing clarity of the separated moving object by deblurring the separated moving, blurring the static background, and reintegrating the deblurred separated moving object onto the blurred static background in the position of the images where the separated moving object was extracted.

2. A method according to claim 1, characterized in that the separated and extracted moving object includes pixels in a border area behind the moving object relative to the direction of the moving object which is a mixture of pixels from both the moving object and the static background.

3. A method according to claim 2, characterized in that the mixture of pixels from both the moving object and the static background are blended into the blurred static background when the deblurred separated moving object is reintegrated onto the blurred static background.

4. A method according to claim 1, characterized in that the step of deblurring includes reversing motion blur by using convolution and deconvolution of a Point Spread Function (PSF) derived from velocity amplitude and direction of the moving object together with its distance to the cameras capturing the moving object.

5. A method according to claim 4, characterized in that the distance to the moving object from the at least three cameras capturing the moving object is derived from the captured images.

6. A method according to claim 1, characterized in that the step of blurring the static background includes using a Gaussian blur function on the pixels of the static background.

7. A multiple camera system comprising at least three cameras, each camera having at least partly overlapping fields of view for removing blur in a moving object relative to a static background, characterized in comprising a processor device adjusted to separate and extract the moving object from the static background by isolating pixels corresponding to the moving object and distinguishing the isolating pixels from the static background by using images captured by the at least three cameras having a field of view covering the moving object, enhance clarity of the separated moving object by deblur of the separated blurring the static background, and reintegrating the deblurred separated moving object onto the blurred static background in the position of the images where the separated moving object was extracted.

* * * * *